(12) United States Patent
Tsoi et al.

(10) Patent No.: US 7,017,846 B2
(45) Date of Patent: Mar. 28, 2006

(54) RETRACTABLE CABLE WINDER

(75) Inventors: Chung Haap Tsoi, Hong Kong (HK); Frederick Ying-shu Chan, Hong Kong (HK)

(73) Assignee: ComStar Communications Ltd., Kwun Tong (HK)

( * ) Notice: Subject to any disclaimer, the term of this patent is extended or adjusted under 35 U.S.C. 154(b) by 175 days.

(21) Appl. No.: 10/781,779

(22) Filed: Feb. 20, 2004

(65) Prior Publication Data

US 2005/0184186 A1 Aug. 25, 2005

(51) Int. Cl.
*B65H 75/48* (2006.01)
(52) U.S. Cl. ..................... 242/378.2; 174/69
(58) Field of Classification Search ............ 242/378.1, 242/378.2; 174/69
See application file for complete search history.

(56) References Cited

U.S. PATENT DOCUMENTS 5,094,396 A * 3/1992 Burke .................... 242/378.2
5,655,726 A * 8/1997 Peterson et al. ......... 242/378.2

* cited by examiner

*Primary Examiner*—John Q. Nguyen
(74) *Attorney, Agent, or Firm*—Stites & Harbison PLLC; Ross F. Hunt, Jr.

(57) ABSTRACT

A cable winder is disclosed. The winder takes into consideration the minimum-bending radius of the optical fiber cables and minimizes cable attenuation when optical fiber cables are being stored. The winder allows only one end of the cable to be extended and rewind, while the other end of the cable, which operatively connects to the retractable cable, remains stored inside the cable winder without being damaged by the axial twist resulted from the winding action of the retractable cable. The winder enables a user to pre-determine the dimension of cable length and cable efficiency in order to maximize operation effectiveness.

7 Claims, 8 Drawing Sheets

RETRACTABLE CABLE WINDER

FIELD OF THE INVENTION

This invention relates to a cable winder which allows only the retractable end of a cable to be released and winded up while the other end of the cable remains stored inside the cable winder without being damaged by the winding action of the cable which commonly occurs due to axial twisting on the cable. The invention can be also used for optical fiber cables, as well as non-optical fiber cables, such as cooper or steel or other wires and cables.

BACKGROUND OF THE INVENTION

Cable winders are quite common amongst cable users for storing telephone or other utility cords. By using a cable winder, the user avoids the messy twisting, kinking, crinkling and coiling up of extended cables. However, a major problem with the conventional cable winders is the axial twist created by the winding action of the stored cable along the rotational axis of the winder case. This axial twist often results in cable damage since for every turn of winding the cable, it twists the centre core 360°. The more turns the cable winds, the greater the damage is resulted from the axial twist. While ordinary electrical cables may be able to sustain some extents of twisting, it will create unmanageable damages to optical fibre cables due to the inherent physical properties of these cables which limit the bending radius of the optical fibre within the cable.

One solution to solve this problem was to extend the stored cable from both ends of a cable winder such that the axial twisting action created by extending one end of the cable is compensated by the axial twisting action created by extending the other end of the cable in an opposite direction. An example is shown in U.S. patent application Ser. No. 09/963,264 (published on Apr. 11, 2002). Such traditional double extension method is evidently unsatisfactory for the simple reason that it is undesirable to extend both ends of the cable.

Attempts have been made to address this double extension shortcoming in the prior art. For example, U.S. Pat. No. 5,094,396 (issued Mar. 10, 1992 to Burke) teaches a telephone cord retractable reel assembly which allows one end of the phone cord to extend while the other end remains stationary. Similarly, U.S. Pat. No. 5,718,310 (issued Feb. 17, 1998 to Gallo) discloses a telephone cord winder which does not require both ends to be extended at the same time. These winders are designed for telephone cords and are not suitable for optical fibre cables since electrical circuitry connectors are required in telephone cord reels to ensure conductivity of electric signals. In U.S. Pat. No. 5,655,726 (issued Aug. 12, 1997 to Peterson et al.), an uni-directional cord take-up reel which devoid the need for electrical connectors is disclosed. Another example for such cord reel is shown in U.S. Pat. No. 6,405,961 (issued Jun. 18, 2002 to Mastrangelo) directed to optical fiber cable storage. These types of reels, however, are still subject to axial twisting as the reel turns and causes the cable to be twisted in the middle region of the reel.

Endeavours have also been made to minimize attenuation of the minimum-bending radius of optical fiber cable with a view to preserving the physical property of the cable. For instance, U.S. Pat. No. 6,349,893 (issued Feb. 26, 2002 to Daoud) teaches a retractable storage reel specifically designed for optical fiber cables by ensuring the minimum radius of curvature of the reel barrels is equal to or greater than the minimum bend radius of the optical fiber cable. However, this design requires the cable to be extended from both ends simultaneously. In U.S. Pat. No. 6,220,413 (issued Apr. 24, 2001 to Walters et al.), it provides for an optical fiber cable reel which avoids the axial twist problem. However, a user must return the connector panel to the centre of the reel before extending or retracting the cable, thus requiring the user to remove all connection every time when the reel is used.

It is therefore highly desirable to design a cable winder which only extends and retracts one end of the cable and, at the same time, avoids the damaging effects created by axial twisting and yet able to minimize the attenuation of the cable due to bending.

It is also advantageous to be able to lock a portion of a paid-out length of the extended cable by ratchet-pawl action, and to automatically rewind the extended cable by simply releasing the ratchet-pawl lock without having the need to resort to special tools.

SUMMARY OF THE INVENTION

The present invention provides a retractable cable winder which enables a paid-out length of a retractable cable to be extended from the winder without the need to also extend the other stationary end of the cable. The design of the winder according to the present invention enables the stationary end of the cable to curl up inside the buffer compartment of the winder. As the retractable end extends, the upper and lower track reels, which store the retractable cable, also turns. Since the stationary cable is a continuation of the retractable cable, the turning force of the track reel compels the stationary cable to turn in an opposite direction within the circular buffer compartment. Since the buffer compartment is relatively large, the stationary cable simply starts to curl up and slowly tightens around the buffer reel seat located at the center of the buffer reel. After use, as the retractable cable is being retracted and winded up inside the winder, the stationary cable within the buffer compartment will turn in the opposite direction and becomes loosely curling around the reel seat. Thus, the winder of the present invention enables the user to extend and to retract a predetermined length of a cable by simple actions, with relative ease and without the need to use any tool.

It is a principal object of the invention to provide an improved cable winder which only extends one end of the cable and still preserves the physical properties of the cable. In the case of optical fiber cables, the construction and operation of the improved cable winder eliminates any damages to the optical fiber created by axial twisting on the cable. Accordingly, the present invention provides for a cable winder for retractably extending a cable from a retractable end of the cable, while the other end of the cable remains stationary and curling up inside the cable winder, the winder comprising a front and a back housing, whereby the housing defines a stationary cable buffer compartment, a retractable cable compartment, a lock compartment and a coil-spring compartment, wherein (i) the stationary cable buffer compartment comprises a stationary cable buffer reel with a reel seat substantially smaller in diameter then the buffer reel and located in the center of the reel for windingly loosening and tightening the stationary end of the cable within the buffer compartment; (ii) the retractable cable compartment comprises an upper and a lower spiral track reels with spiral tracks provided thereon, wherein the center of the reels is in rotatable communication with a retractable coil-spring shaft and a predetermined length of the retractable end of the cable being stored in the upper and lower spiral tracks; the cable operatively continues to become the stationary end after passing through a through hole provided on the spiral track reels therein; (iii) the lock compartment comprises a ratchet reel lockable by a pawl lock arm and operatively engaged to the retractable coil-spring shaft; and (iv) the coil-spring compartment comprises a coil-spring demountably engaged to the retractable shaft attached to the inside of the back housing, whereby a receiving slot is provided on the shaft for torsionally coupled to the spiral track reels and the ratchet reel.

BRIEF DESCRIPTION OF THE DRAWINGS

Advantages and features of the invention will become more apparent with reference to the following description of the presently preferred embodiment thereof in connection with the accompanying drawings, wherein like references have been applied to like components, in which.

DETAILED DESCRIPTION OF THE PREFERRED EMBODIMENTS

The retractable cable winder of the present invention is comprised of the front and back housings. Inside the winder, there are four compartments, namely a stationary cable buffer compartment, a retractable cable compartment, a coil-spring compartment and a lock compartment.

Figure 1:
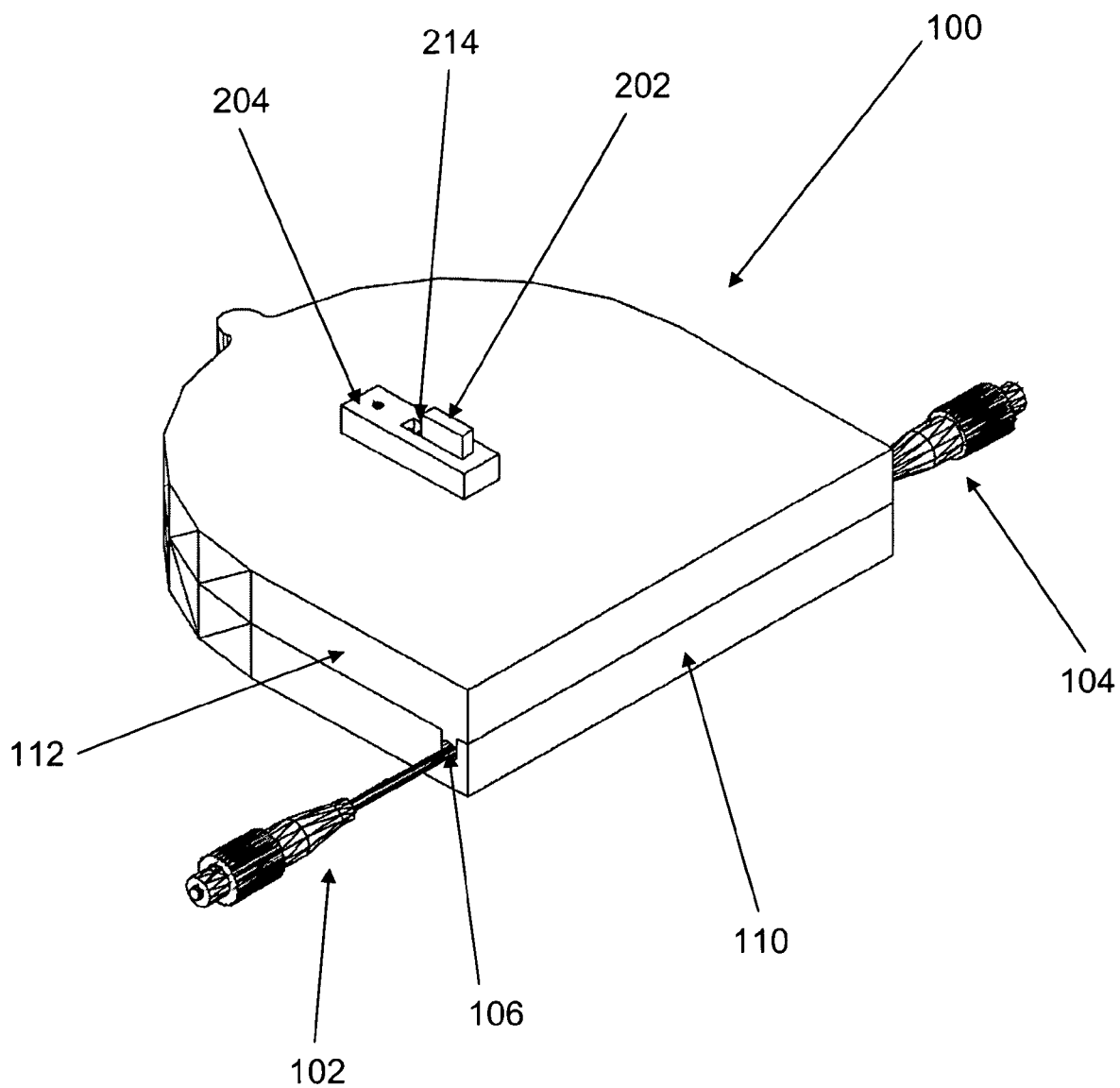
FIG. 1 is a front perspective view of the retractable optical fiber cable winder of the present invention.
Figure 2:
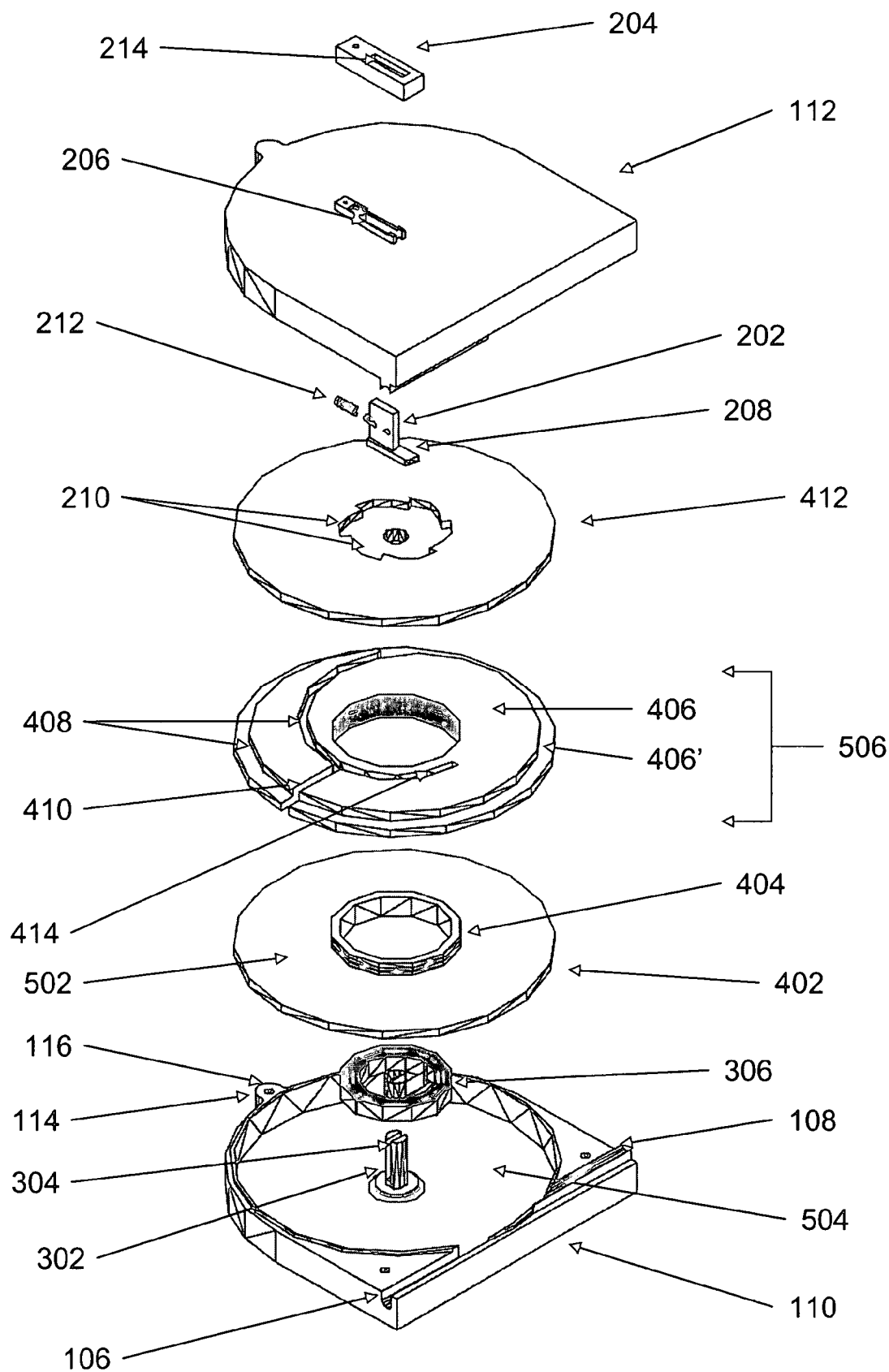
FIG. 2 shows an exploded view of the various components of the cable winder of the present invention.

Referring to FIGS. 1 and 2, FIG. 1 shows a perspective view of the cable winder 100 of the present invention. The end portion of stationary cable 102 projects out from the housing through aperture 106, while the end portion of retractable cable 104 projects out from the housing through aperture 108 (see FIG. 2).

FIG. 2 shows an exploded view of the cable winder of the present invention. The inside of the back cover housing 110 has a circular periphery sufficiently large enough to define the space required for the cable buffer compartment and the coil-spring compartment. The bottom side of the back cover housing 110 is substantially flat to enable the winder to rest on a flat surface. Housing fastening boss 114 and corresponding fastening bore 116 are provided for joining the front and back cover housings together.

A retraction shaft 302 is provided at the center of back cover housing 110. Along the longitudinal center of shaft 302 is a retraction shaft-receiving slot 304. A conventional coil-spring 306 is biasedly mounted to the retraction shaft-receiving slot 304 within the coil-spring compartment 504. Coil-spring 306 operatively engages to the other rotational reels and is discussed further below. Coil-spring 306 compresses in a helical fashion as the retractable cable extends, thereby generating a torsional force which allows the ratchet reel 412 step-lock and control the paid-out length of the retractable cable. The user can therefore stop the cable extension at any desirable position.

Above the coil-spring sits the buffer reel 402 which houses the stationary cable 102. Buffer reel 402 is not operatively engaged to the retraction shaft 302 though when it rotates, it revolves along shaft 302. Buffer reel 402 defines a relatively large circular space that forms the stationary cable buffer compartment 502. A buffer reel seat 404 is located at the center of buffer reel 402. Buffer reel seat 404 is substantially smaller in diameter then buffer reel 402 and is used for windingly loosening and tightening the stationary cable within the buffer compartment 502.

For optical fibre cables, care must be taken to preserve the minimum-bending radius of the cable. It is recommended that the diameter of reel seat 404 be at least the same or slightly larger than the bending radius of the optical fiber cables. For example, if the bending radius of the cable is 10 mm, then the diameter of the reel seat 404 should be at least 10 mm. For cables other than optical fibre cables, the diameter of the reel seat can be of any size suitable to accommodate the total paid-out length and thickness of the cable.

Figure 5:
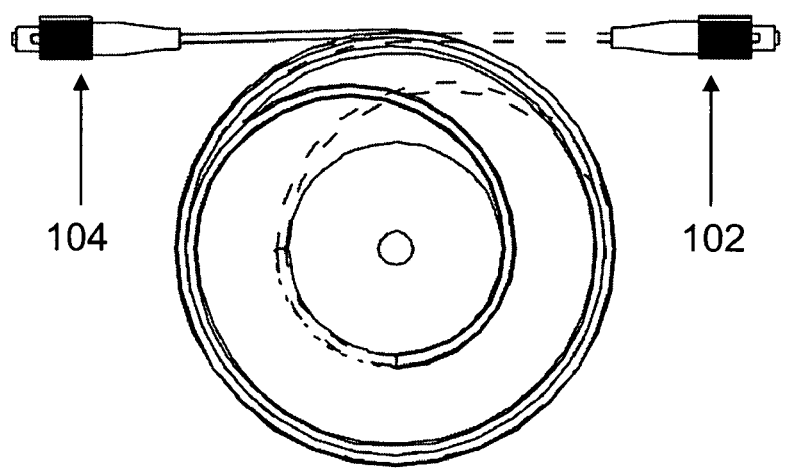
FIG. 5 is a schematic drawing showing the orientation of the retractable cable resting in the spiral reel, and the stationary cable loosely curled around the buffer reel.
Figure 5B:
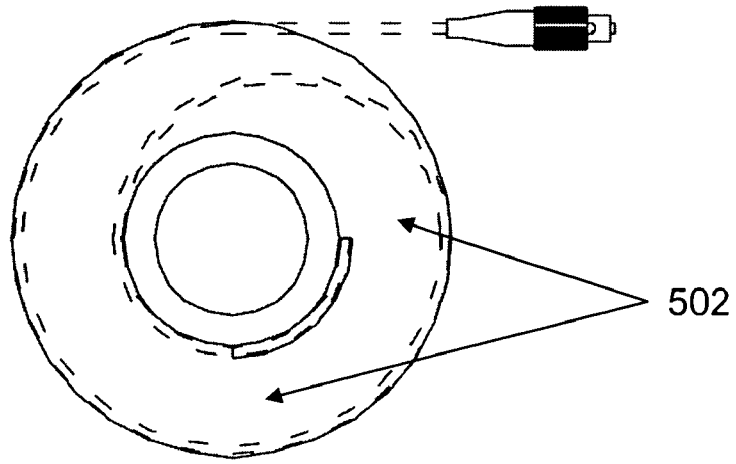
Figure 6:
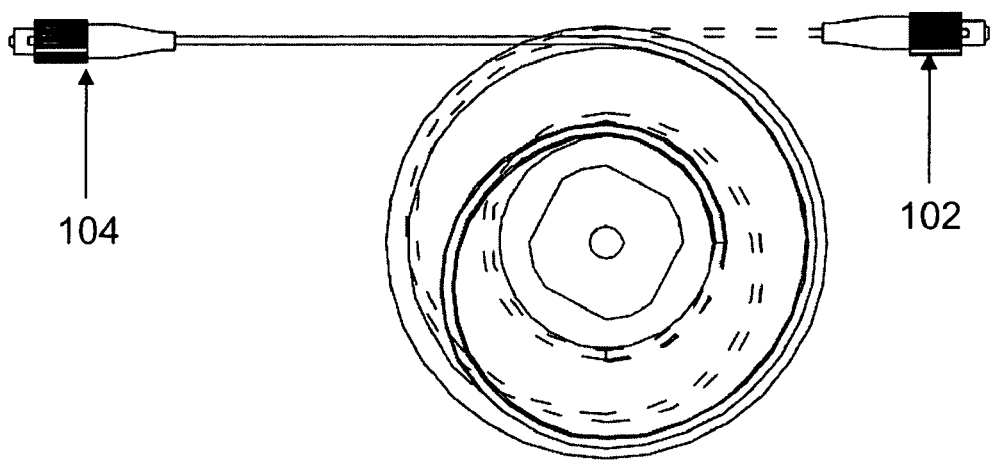
FIG. 6 is a schematic drawing showing the orientation of the retractable cable extending from the spiral reel, and the stationary cable just begins to curl around the buffer reel.
Figure 7:
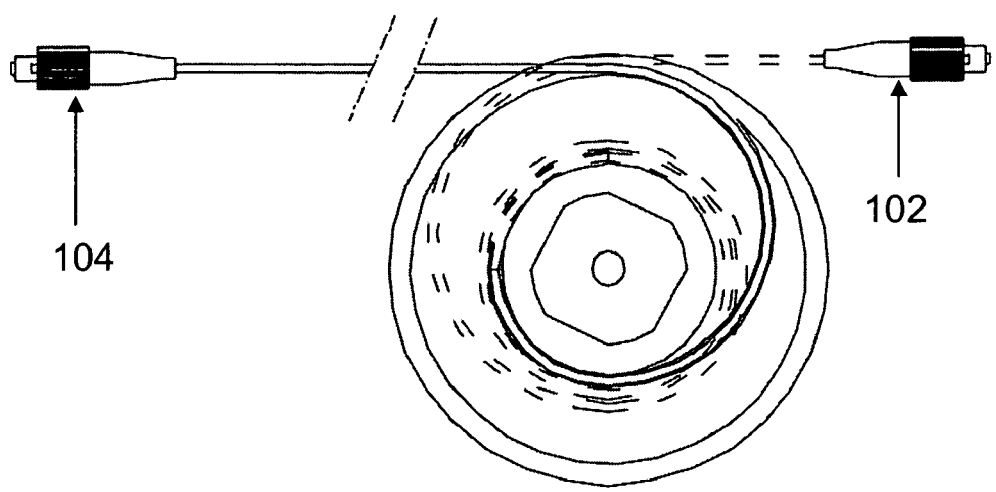
FIG. 7 is a schematic drawing showing the orientation of the retractable cable being extended nearly completely from the spiral reel, and the stationary cable curled tightly around the buffer reel.

The circular space in the buffer compartment 502 allows stationary cable 102 to be stored (see FIGS. 5, 6 and 7). Stationary cable 102 curls around the reel seat 404. Due to the inherent biasing force exerted by the cable, stationary cable 102 naturally expands against the periphery wall along the back cover housing 110 when in stored position (see FIG. 5b).

Abutting and located above the buffer reel 402 is the retractable cable compartment 506. Within retractable cable compartment 506 are two spiral track reels, namely upper spiral track reel 406 and lower spiral track reel 406', for housing the retractable cable 104. The upper and lower spiral track reels are contiguously attached to each other. The upper and lower spiral track reels are essential to the functioning of the present invention. Together, they enable the cable to be winded continuously without being bended or twisted. Optionally, a cable slit 410 (see FIG. 2) is provided to facilitate easy insertion of the cable when the cable is placed inside the winder for the first time. Cable slit . . . (continues with the sentence below—will be fixed for submission) Cable slit 410 extends radially from the outboard edge of the upper and lower spiral track reels to spiral track 408 (see below). The upper and lower spiral track reels rotationally engage to coil-spring 306.

Figure 3A:
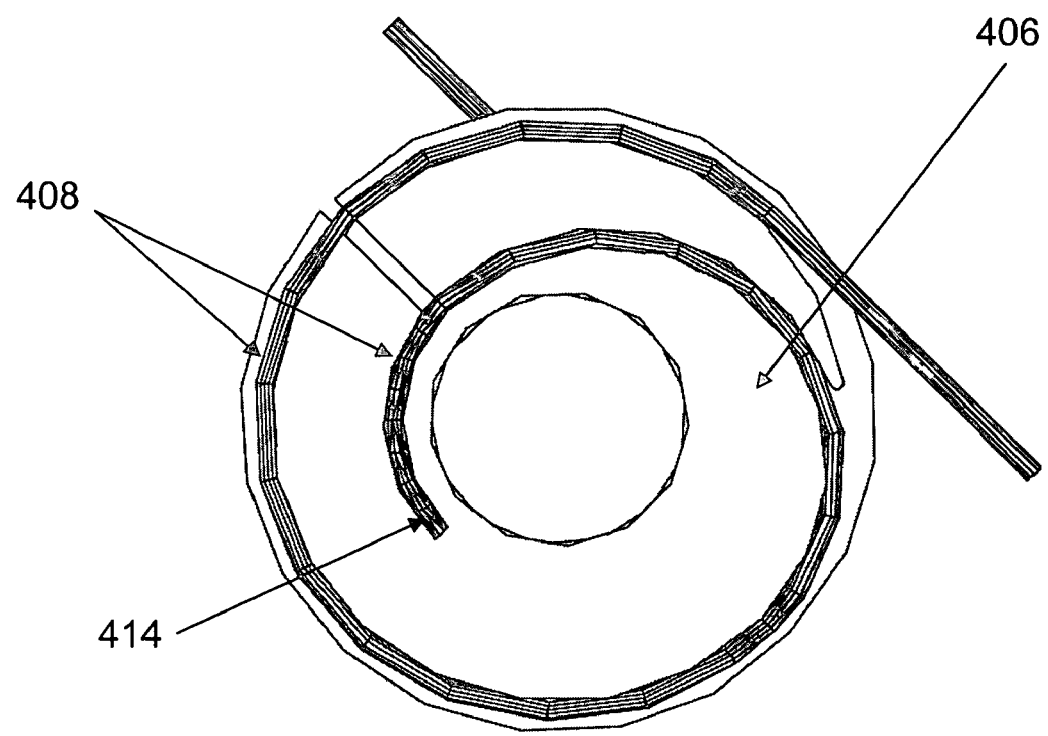
FIG. 3a and FIG. 3b are two slightly different perspective views showing the upper spiral track reel with the retractable cable winded within the spiral groove.
Figure 3B:
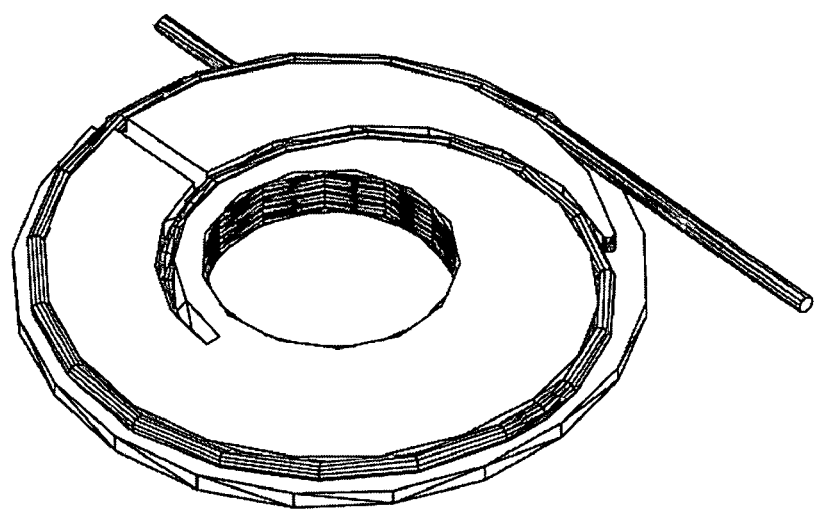
Figure 4A:
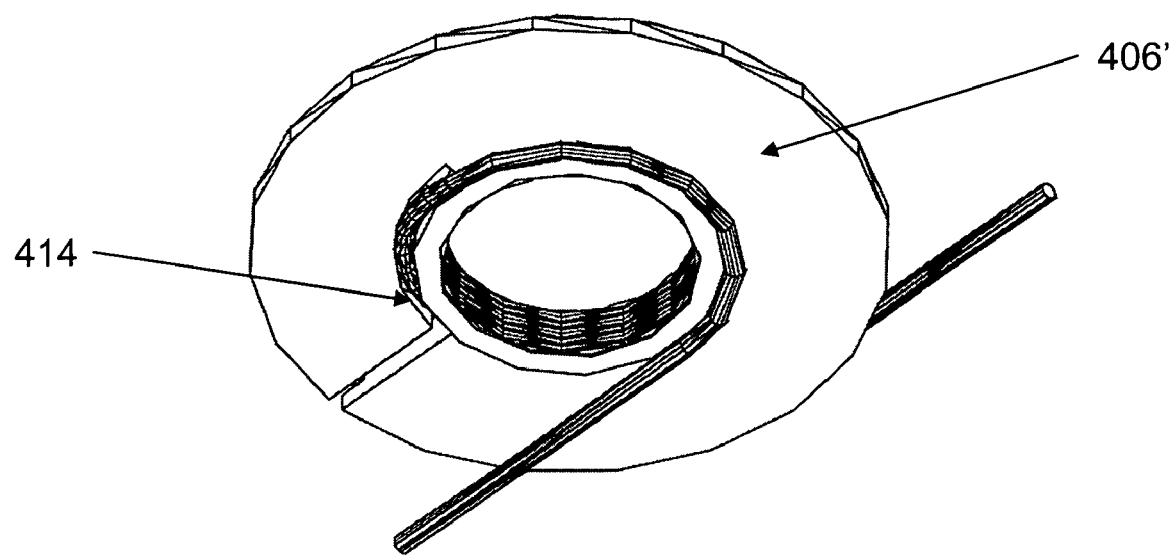
FIG. 4a and FIG. 4b are two slightly different perspective views showing the underside of the lower spiral track reel with the stationary cable extending from the cable transition through hole.
Figure 4B:
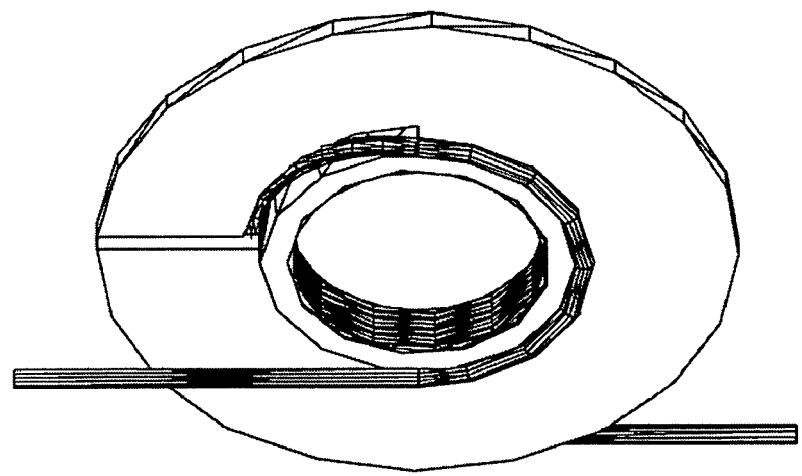

As shown in FIGS. 3a and 3b, a spiral track 408 is provided on the upper spiral track reel 406. The spiral track takes the name from its configuration since it spirals on upper track reel 406 with track 408 to define the storage groove for the retractable cable 104. As with the dimension of buffer reel seat 404, the angle of turning on track 408 is designed to preserve the minimum-bending radius of commonly used optical fiber cables. Accordingly, the diameter of the spiral track reels 406 and 406' is at least the same or slightly larger than the bending radius of the optical fiber cables. For instance, if the bending radius of the cable is 10 mm, then the diameter of the track reels should be at least 10 mm. It is desirable that the length of track 408 is predetermined and corresponds to the length of the paid-out cable. If the winder is used for non-optical fiber cables, such as cooper or steel or other metallic wires and cables, then the turning angle is of less relevance.

As can be seen from FIGS. 3a, 3b, 4a and 4b, while retractable cable 104 is stored in the groove of track 408, it continues on and passes through the cable transition through hole 414 and emerges from the other side of cable transition through hole 414 located on the underside of the lower spiral track reel 406'. After emerging from the through hole 414, the emerged portion of the cable is referred to as the stationary cable which rests in the stationary cable buffer compartment 502.

FIGS. 5, 5a, 5b, 6, 6a, 6b, 7, 7a and 7b show the configuration of the retractable and stationary cables and the orientation of the upper and lower track reels at different stages of the retractable cable unwinding operation.

Figure 5A:
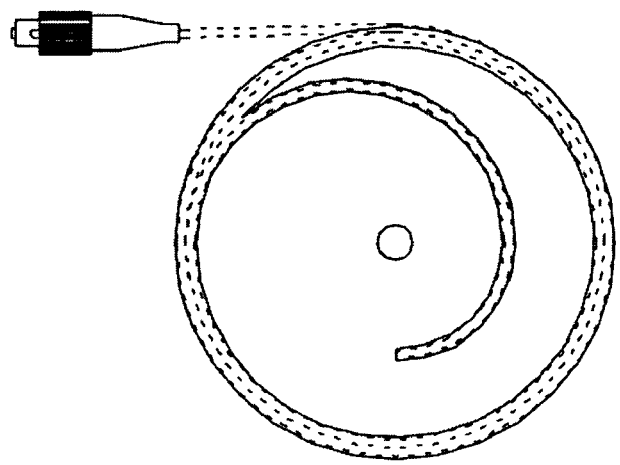
FIG. 5a and FIG. 5b are schematic drawings showing, separately and respectively, the orientation of the retractable cable resting in the spiral reel, and the stationary cable loosely curled around the buffer reel.

FIGS. 5, 5a and 5b illustrate the cable in full storage position, i.e., completely retracted position. In this position, the full length of the retractable cable 104 rests wholly within track 408, while the corresponding length of the stationary cable 102 curls up loosely against the periphery of the back cover housing 110 inside the stationary cable buffer compartment 502.

Figure 6A:
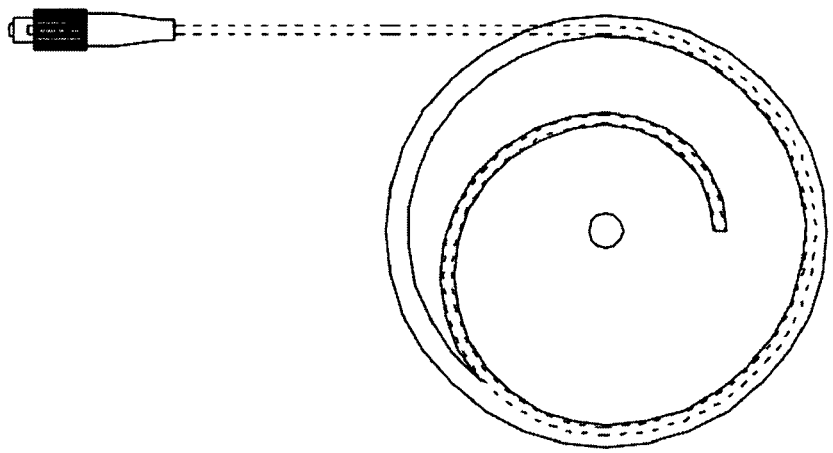
FIG. 6a and FIG. 6b are schematic drawings showing, separately and respectively, the orientation of the retractable cable extending from the spiral reel, and the stationary cable curling around the buffer reel.
Figure 6B:
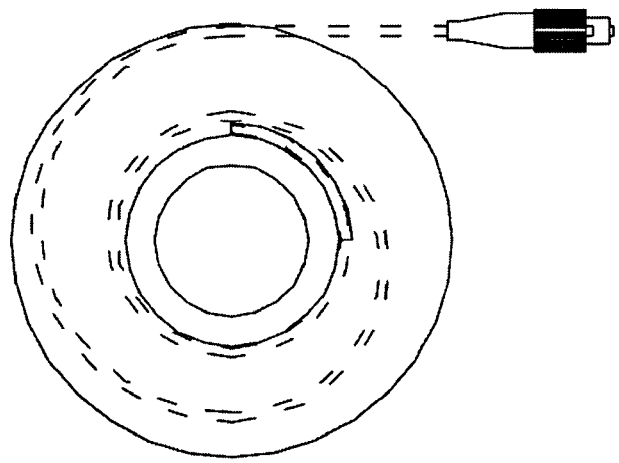

FIGS. 6, 6a and 6b show position of the cable in the intermediate stage of extension. As the retractable cable 104 is being extended, the upper and lower spiral track reels 406 and 406' rotate in the same direction as the retractable cable 104. Since retractable cable 104 connects to the stationary cable 102 through the through hole 414, the cable will not be subject to axial twist because it simply continues on as one cable. Even though buffer reel seat 404 is engaged to coil-spring 306 and turns as the retractable cable 104 extends, it does not prevent the stationary cable 102 from curling slightly tighter around the buffer reel seat 404. Thus, the circular space surrounding this area is designated "stationary" cable buffer compartment 502. This "anti-motion" phenomenon is a unique feature of the present invention because it eliminates the damaging attenuation effect caused by the torque created by axial twist of the retractable cable 104.

Figure 7A:
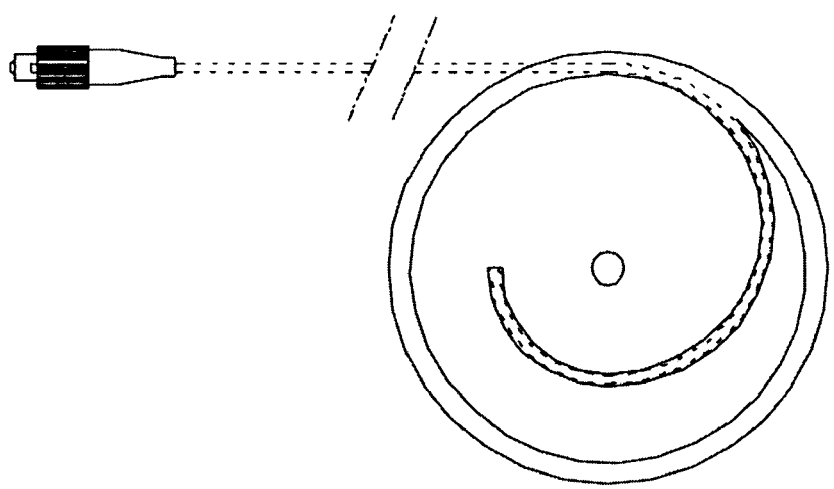
FIG. 7a and FIG. 7b are schematic drawings showing, separately and respectively, the orientation of the retractable cable being extended nearly completely from the spiral reel, and the stationary cable curled tightly around the buffer reel.
Figure 7B:
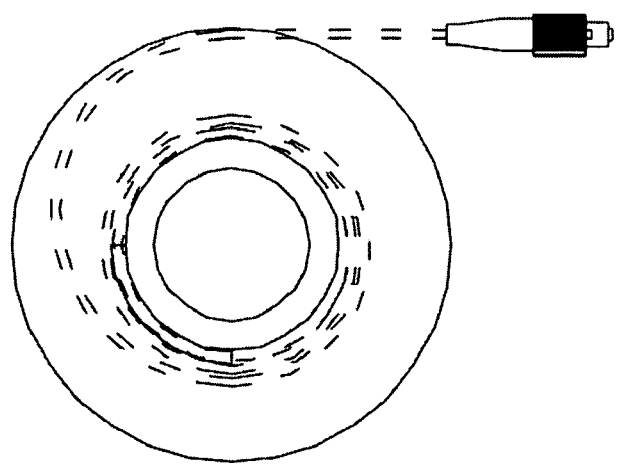

As retractable cable 104 continues to extend, the stationary cable 102 keeps on curling around the buffer reel seat 404 with increasing compactness, i.e., becoming tighter and tighter. However, in the case of optical fiber cables, since the diameter of the reel seat 404 is designed to preserve the minimum-bending radius of common optical fiber cable, even if stationary cable 102 is tightly curled up against reel seat 404, it will not cause any damage to the physical properties of the optical fiber cable. FIGS. 7, 7a and 7b show the fully extended retractable cable 104, with the stationary cable 102 tightly curled up inside the buffer compartment 502.

In order to achieve the best results, the length and the efficiency of the cable can be pre-determined in accordance with the following calculations and example.

Efficiency of cable is the length of the retractable portion of the cable $L_1$ to the total cable length, which is the sum of $L_1$, the length of buffer compartment $L_2$ and the stationary portion of the cable $L_3$ in the retractable cable winder.

When the retractable portion of the cable warps around spiral track reel completely once with mean diameter E, the number of loop N in the spiral track reel is given by, $$N=L_1/\pi E. \tag{1}$$

Under this situation, the length of buffer compartment warps around buffer reel with number of loop M. When the retractable portion of the cable is pulled out completely, both spiral track reel and buffer reel rotate N turns and so the total number of loop in spiral reel is 0 while in buffer reel is M+N. Using this condition, the following equation is devised, $$M\pi F=(M+N)\pi G$$

$$M=NG/(F-G) \tag{2}$$

where F is the mean diameter of loops in buffer reel when the retractable portion of the cable warps around spiral reel completely and G is the mean diameter of loops in buffer reel when the retractable portion of the cable is pulled out completely. As M is given by, $$M=L_2/\pi F, \tag{3}$$

where $L_2$ is the length of buffer compartment. Thus, by substituting (1) and (3) into (2), the following relationship is obtained:

$$L_2=L_1FG/E(F-G) \tag{4}$$

and so the Efficiency of Cable is ascertained by, $$\text{Efficiency}=L_1/(L_1+L_2+L_3) \tag{5}$$

The parameters E, F, G and $L_3$ are per-determined. If a target retractable cable length is known, the total cable required for the retractable cable winder can be readily established.

EXAMPLE

Assume the value of E, F, G, and $L_3$ is 0.09, 0.08, 0.06 and 0.11 respectively, if the user wants to know the Efficiency of Cable for 1 m retractable cable, by equation (4) the user gets 2.67. The total cable length is 1+2.67+0.11=3.78 m. i.e. The Efficiency of Cable for the winder is 0.26. The cable winder of the present invention further comprises a ratchet reel 412 for locking and communicating with the spring-urged pawl lock button 202. Ratchet reel 412 is located immediately above the upper spiral track reel 406 and is operatively engaged to the coil-spring 306.

The locking and releasing mechanisms of the present invention consist of a pawl spring 212 urging against the pawl lock button 202, which has a pawl spring lock arm 208 attached thereunder (see FIG. 2). As the retractable cable 104 extends and the ratchet reel 412 rotates, the urging force exerted by the pawl spring 212 pushes the pawl spring lock arm 208 forward and engages one of the many ratchet reel teeth 210, thereby step-locking the paid-out length of the retractable cable 104, until the user stops pulling the retractable cable 104. When the user wishes to retract the extended retractable cable 104, the user simply pushes the spring-urged pawl lock button 202 away to disengage the pawl lock arm 208 from the ratchet reel teeth 210. The torque force of the retractable coil-spring 306 returns the spiral track reels 406 and 406', together with the retractable cable 104, back to the storage position.

Figure 8:
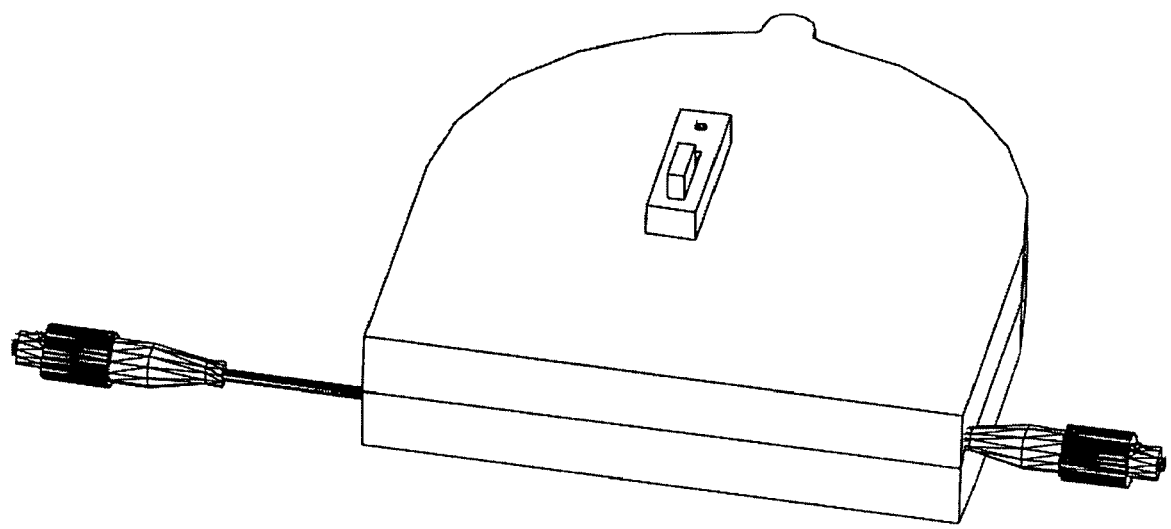
FIG. 8 is another front perspective view of the retractable optical fiber cable winder of the present invention showing the spring-urged pawl lock slightly off-centred on the front cover housing.

Referring now to FIGS. 2 and 8, the present invention provides a front cover housing 112 in order to properly encase the cable winder. Front cover housing 112 mirrors the shape of back cover housing 110 so that the two covers snip fit onto one another at the closed position. Suitable pin-and-bore arrangement, such as bore 116 located at boss 114, or other fastening means can be used to join the two housings. The spring-urged pawl lock button 202 is provided on the outside and located near but off the center of the front cover housing 112. Lock button 202 passes through opening 214 on front cover housing 112 and protrudes through lock cover 204. A slit 206 on lock cover 204 allows button 202 to be pushed away by a user and urgedly releasing the pawl lock arm 208 from the ratchet reel teeth 210 (see FIG. 2), thereby enabling the retractable cable 104 to be rewind into the winder.

As the retractable cable 104 is being rewind, the stationary cable 102 starts to uncurl around the buffer reel seat 404 in the stationary cable buffer compartment 502. When retractable cable 104 is completely rewind, then the stationary cable 102 will return to its original configuration, i.e., loosely curled against the periphery wall along back cover housing 110 (see FIGS. 5, 5a and 5b).

It is readily understood that the shape of the front and back cover housings 112 and 110 is not limited to those disclosed herein. Likewise, any suitable biasing means able to urge the retraction mechanism and the spring-urged pawl lock mechanism with functional equivalence is within contemplation of the present invention. The coil-spring 306 and pawl spring 212 are merely examples of preferred embodiments disclosed in this invention herein.

Hence, although the present invention has been described with referenced to the preferred embodiment, it will be appreciated by those skilled in the art that various modifications, alternations, variations, and substitutions of parts and components may be made without departing from the spirit and scope of the invention. Therefore, the present application is intended to cover such modifications, alternations, variations, and substitutions of parts and components.

What is claimed is:

1. A cable winder for retractably extending a cable from a retractable end of said cable, while the other end of the cable remains stationary and curling up inside the cable winder, said winder comprising a front and a back housing, whereby said housing defines a stationary cable buffer compartment, a retractable cable compartment, a lock compartment and a coil-spring compartment, wherein:

the cable buffer compartment comprises a stationary cable buffer reel with a reel seat substantially smaller in diameter then said buffer reel and located in the center of said reel for windingly loosening and tightening the stationary end of said cable within the buffer compartment;

the retractable cable compartment comprises an upper and a lower spiral track reels with spiral tracks provided thereon, wherein the center of said reels is in rotatable communication with a retractable coil-spring shaft and a predetermined length of the retractable end of said cable being stored in said upper and lower spiral tracks; said cable operatively continues to become the stationary end after passing through a through hole provided on said spiral track reels therein;

the lock compartment comprises a ratchet reel lockable by a pawl lock arm and operatively engaged to the retractable coil-spring shaft; and the coil-spring compartment comprises a coil-spring demountably engaged to said retractable shaft attached to the inside of said back housing, whereby a receiving slot is provided on said shaft for torsionally coupling the coil spring to the spiral track reels and the ratchet reel.

2. The cable winder of claim 1, wherein efficiency of said cable is determined by:

Efficiency=$L_1/(L_1+L_2+L_3)$ where $L_1$ is the length of the retractable portion of the cable, $L_2$ is the length of buffer compartment and $L_3$ is the length of the stationary portion of the cable in said cable winder.

3. The cable winder of claim 2, wherein said cable is optical fiber cable.

4. The cable winder of claim 1, wherein said cable is optical fiber cable.

5. The cable winder of claim 4, wherein the diameter of said buffer reel and said upper and lower spiral track reels is at least 10 mm.

6. The cable winder of claim 4, wherein the diameter of said buffer reel and said upper and lower spiral track reels is at least the same or slightly larger than the bending radius of said optical fiber cable.

7. The cable winder of claim 1, wherein a cable slit is provided on the upper and lower spiral track reels, said slit extends radially from the outboard edge of said reels to said spiral track.

* * * * *